Oct. 6, 1942.  R. K. LEE  2,297,900
PNEUMATIC MOTOR
Filed June 16, 1939
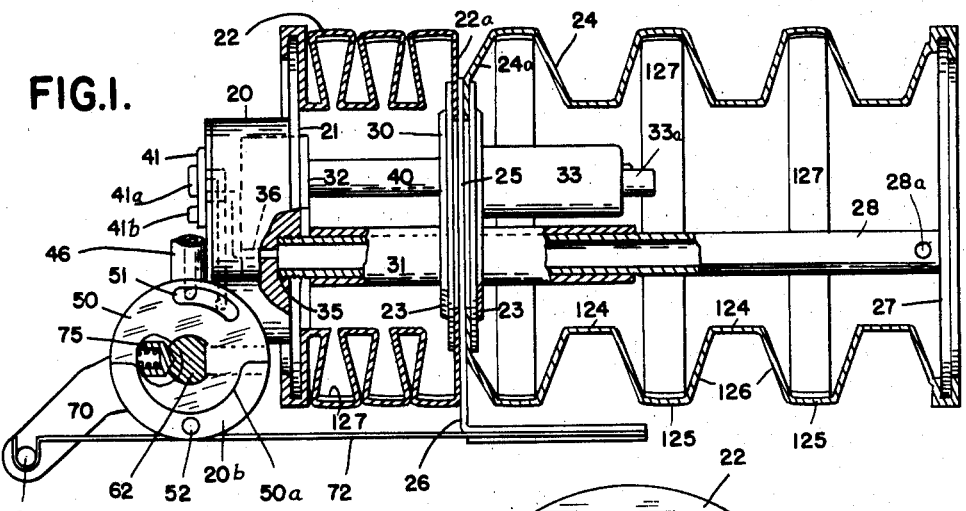
FIG.1.
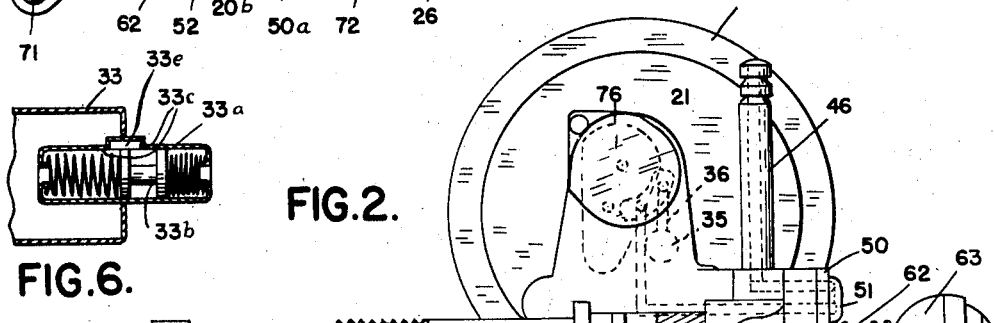
FIG.6.  FIG.2.
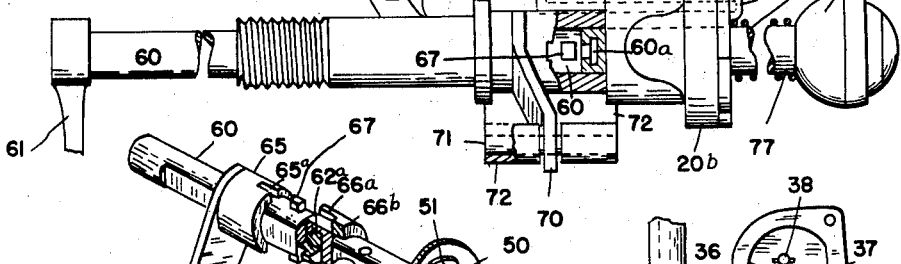
FIG.4.
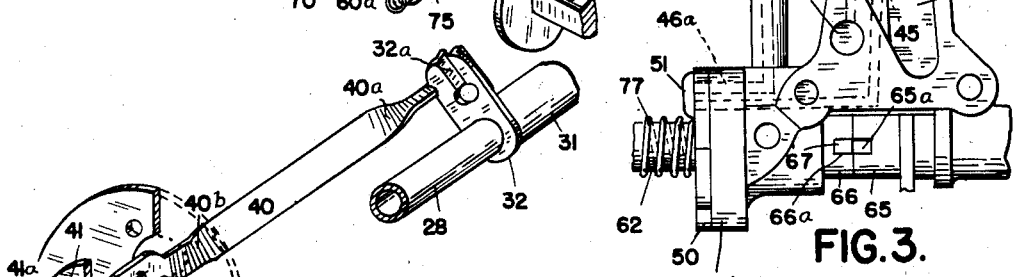
FIG.5.  FIG.3.
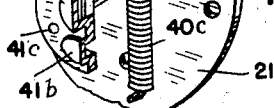
INVENTOR.
ROGER K. LEE
BY Swan, Fryer, & Hardesty
ATTORNEYS Patented Oct. 6, 1942

2,297,900

UNITED STATES PATENT OFFICE 2,297,900

PNEUMATIC MOTOR

Roger K. Lee, Highland Park, Mich., assignor to Kenlee Corporation, Detroit, Mich., a corporation of Michigan Application June 16, 1939, Serial No. 279,409

10 Claims. (Cl. 15—255)

The present invention relates to pneumatic motors and specifically to windshield wiper motors and to such motors as a whole as well as to portions thereof.

Among the objects of the invention is to simplify the construction and operation of such motors.

Another object is a motor of the bellows type and such bellows particularly efficient in their use in such motors.

Still another object is a combined valve control and manual blade operating means.

Other objects and advantages will readily occur to those skilled in the art upon reference to the following description and the accompanying drawing in which—

Figure 1 is a side elevation of a motor with parts in section.

Figure 2 is an end elevation with parts in section, looking from the left of Figure 1.

Figure 3 is a view in elevation of a portion of the frame.

Figure 4 is a perspective view of the clutch and shaft assembly.

Figure 5 is a perspective view of the trip valve and mechanism with the valve in section.

Figure 6 is a sectional view of the safety valve.

Referring now to Figure 1, the motor is illustrated as consisting of a frame member 20 having secured to one face thereof a plate 21 serving as a flange over the edges of which is fixed a preferably rubber bellows 22. This bellows 22, which will be described more in detail later, is open at both ends, one end being provided with an annular recessed portion formed to fit the edge of plate 21 and the other end having an inwardly extended flange portion 22a.

The flange 22a is fixed to an air-tight septum or partition indicated as a whole at 30 formed by fixing together two similar plates 23 and 23 with the flange 22a and the corresponding flange 24a of a second bellows identical bellows 24 between them.

Also clamped between plates 23 and 23 is a plate 25 having an extension 26 projecting beyond the walls of the bellows. The other end of bellows 24 fits over a plate 27 fixed to the end of a tube 28 whose other end is fixed into frame member 20.

Passing through the partition 30 and fixed in air-tight relation thereto is a tube 31 of such size as to make a reasonably tight sliding fit over the tube 28 and telescoped thereover. This tube 31 has fixed at the frameward end a small plate 32 of the form shown best in Figure 5. It consists of an elongated oval plate fixed at one end to tube 31 and passing tube 28 and having its other end slotted as at 32a.

Also carried by partition 30 is a thimble 33 located within bellows 24 but open through the partition to the space within bellows 22. This thimble 33 is so located with respect to tube 31 and plate 32 that the slot 32a is opposite the open end of the thimble which carries in its end the safety valve shown in section in Figure 6.

In this figure, the thimble 33 is shown as having in its end a small open end tube 33a which, at one or more points about its mid-section is provided with pressed out short channels 33e. Inside of the tube 33a is a double disc or spool shaped valve 33b having upon either side thereof springs of suitable strength to maintain the valve centered and between the openings 33c in the tube spaced a short distance from the ends of channels 33e, during normal operation. When, however, due to abnormal resistance by the wiper, or for any other reason the vacuum exceeds a predetermined value, the valve 33b will be moved, for example, to the position shown and air can flow in through one of the openings 33c, over one side of the valve through a channel 33e and out of the other opening 33c to relieve the trouble.

As shown in Figure 1, the open end of tube 28 is threaded into a socket 35 from the bottom of which an air passage 36 leads to the opposite face of the frame member 20 while the other end of the tube 28 is provided with one or more openings 28a leading into bellows 24.

As indicated in Figure 3, the face of frame 20 next to plate 21 is recessed as at 20a and this recess communicates with the inside of bellows 22 through suitable openings in the plate. There is also an opening 37 through the frame from recess 29a to the opposite face.

The second opening 38 through the frame 20 is for the passage of the valve operating element 40 which actuates a disc valve 41 located upon the outer face of the frame and controlling flow of air through passages 36 and 37.

The form of valve 41 is shown in Figure 5 as a disc having a central recess 41a for the reception of the T-shaped end of member 40, the latter projecting through opening 38 and into the recess. The disc is also provided with a second arc-shaped recess 41b and small holes 41e, one at each end of recess 41b.

In addition to air passages 36 and 37 opening to the outer face of frame 20 and located between them is a third air passage 45 which leads through the body of frame member 20 to one end thereof and through the oscillating action of valve 41 is connected alternately to the passages 36 and 37 and therefore alternately to bellows 22 and 24. This passage 45 leads eventually to the tube 46 which is connected to a source of suction, such as the intake manifold of an engine. As the valve 41 oscillates, the recess 41b covers the passage 45 and first one of passages 36 and 37 and then the other, and, as one passage is thus connected to passage 45, one of the openings 41e registers with the other and thus opens that particular passage, and its connected bellows, to the atmosphere.

Figure 5 shows the means used to oscillate valve 41. This consists of the member 40 which is as shown a flat strip twisted through a small angle near one end, as at 40a and at another suitable location 40b, these locations being near the ends of the path traveled by the plate 32 as it is carried back and forth by the partition 30. Between the twist 40b and the end fixed to the valve 41 there is secured to member 40, to one side of its center line, a small tension spring 40c, its other end being suitably anchored to plate 21. The member 40 is supported by the walls of opening 38 and plate 21 with its free end extending into the thimble 33.

As stated above, passage 45 connects ultimately to tube 46. This connection is accomplished by leading the passage 45 to the end 20b of the frame to which it opens alongside of the opening of passage 46a, which latter is a continuation of the passage in tube 46.

The face of end 20b is suitably finished to allow the use of a disc throttle valve 50 provided with a recess 51 of sufficient size to connect the two openings. The valve 50 is rotatably mounted against the face of end 20b and its motion limited by cutting away an arc-shaped portion of its edge, as at 50a, and inserting in the said face a pin 52. This limited travel should be sufficient to allow the valve recess to move beyond both openings on either side.

Extending longitudinally through frame 20 is a two-part shaft, to the outer end of one part 60 of which is fixed the wiper arm 61, a suitable blade (not shown) being carried thereby. To the outer end of the other part 62 of the shaft is secured a suitable knob or handle 63.

At their adjacent ends, the parts 60 and 62 of the shaft are connected by a swivel joint produced by providing one of the ends, preferably of part 60, with a button 60a, and the other with an open slot 62a shaped to receive the button 60a. This formation permits independent rotation of the two shaft parts but compels them to move together in longitudinal motion.

Referring more particularly to Figure 4, it will be noted that the shaft parts 60 and 62 are flattened for a portion of their lengths from the joint 60a—62a, and that two short sleeves 65 and 66 are provided. Of these, sleeve 65 is cylindrical inside and ordinarily freely rotatable upon the shaft. The sleeve 66, however, is shaped interiorly to fit the flattened end of shaft part 62 and therefore will be rotated thereby whenever the latter is turned.

Both sleeves 65 and 66 are notched, at 65a and 66a respectively, for the reception of a pin 67 fixed in the shaft portion 60 and the notched edges of the sleeves arranged to abut in the plane of the shaft joint. By this means, moving the shaft 60—62 longitudinally and thereby the pin 67 from one notch to the other will either fix the two shaft parts rotatably together and, at the same time, free sleeve 65 or fix the sleeve 65 to shaft part 60 and free, rotatably, the shaft part 62.

The sleeve 65 has fixed thereto an arm 70 having at its outer end a cross pin 71 connected through suitable pitman means such as a flexible arm 72 to the lateral extension 26 of the movable partition 30 between bellows 22 and 24.

As indicated in Figure 4, the flattened portion of shaft part 62, extending from the frame 20 and carrying knob 63, passes through valve 50, which, being shaped to fit the shaft is turned thereby.

Suitable spring detents such as are shown at 75 may be used to determine the longitudinal and radial positions of the shaft, and a suitable cover plate 76 may be used for valve 41. It is also desirable to provide the valve 50 with a suitable spring 77.

In mounting the motor, the shaft 60 will of course extend to the outside of the windshield (not shown) and the handle or knob 63 in position to be accessible to the operator of the car.

Assuming the motor to be not running, when and if the operator desires to start the wiper, he turns knob 63 and thereby valve 50 to connect the suction tube 46 to the bellows. The motor will then start, but the wiper shaft 60 will not move until the knob 63 is pushed in to move the pin 67 from notch 66a into notch 65a. This movement disconnects shaft 60 from shaft 62 and connects sleeve 65 to the former. With the wiper arm thus operating, speed control may be had by the partial rotation of the knob 63 to more or less close the suction line.

If the wiper is running and the operator desires to stop it, he first pulls the knob 63 to disconnect the wiper shaft 60 from the motor and connect it to the knob shaft. Then, by simply turning the knob, he disconnects the suction and moves the wiper blade to "parked" position.

The bellows 22 and 24 are preferably of rubber, as above stated, and of the form clearly indicated in Figure 1, and are preferably identical in form.

These bellows as shown consist of smaller ring sections 124, preferably cylindrical and larger ring sections 125, also preferably cylindrical, connected by flat annuli 126. These parts are, of course, made integral and integral with the end flanges already mentioned, and, before mounting th bellows on the plates 21 and 27 and the movable partition 30, metal or other stiff material rings 127 are inserted in the ring portions 125.

These rings 127 prevent the collapse radially of the bellows and are of sufficient width so that, when the bellows is fully collapsed longitudinally, the portions 124 remain out of contact with each other as indicated in the showing of bellows 22 (this being shown collapsed).

By this use of rings 127, the full effective outside area of the bellows is utilized throughout the length of its movement, and thereby greater efficiency and power is obtained.

It should be noted that the bellows 22 and 24, partition 23—25, extension 26 and pitman 72, together with the thimble 33 and guide tube 31 constitute a sub-assembly removable as a unit by detaching the bellows from plates 21 and 27 and unscrewing the guide tube 28.

This construction makes this portion of the motor readily replaceable and also provides for replacing the bellows with larger or smaller bellows, if it is desired to increase or decrease the torque delivered to the wiper shaft.

What I claim is:

1. In a windshield wiper motor, a pair of bellows arranged end to end and fixed at their outer ends against movement, a movable partition separating the said bellows, means for alternately collapsing and expanding said bellows whereby to reciprocate said partition, a wiper shaft, a crank arm adapted to cooperate with said shaft to oscillate the latter, pitman means connecting said partition to said arm, and means for connecting and disconnecting at will said arm and said shaft.

2. In a pneumatic motor, a pair of expansible and collapsible chambered elements adapted to be alternately expanded and collapsed by variation of pneumatic pressure therein, pitman means actuable by said alternately expanding and collapsing elements, a shaft actuable by said pitman means, manually operable means for controlling said variation of pneumatic pressure, and clutch means for disconnecting said shaft and pitman means and connecting said shaft and manual means, whereby said shaft may be manually actuable.

3. In a pneumatic motor, a pair of expansible and collapsible chambered elements adapted to be alternately expanded and collapsed by variation of pneumatic pressure therein, pitman means actuable by said alternately expanding and collapsing elements, a shaft actuable by said pitman means, manually operable means normally disconnected from said shaft, and clutch means for disconnecting said shaft and pitman means and connecting said shaft and manual means, whereby said shaft may be manually actuable.

4. In a pneumatic motor, a driven shaft, a second shaft in axial alignment with the first and constructed and arranged to be rotatable and also movable longitudinally, means actuable during rotary movement of said second shaft to control the motor drive of said first shaft, and means actuable during said longitudinal movement to disconnect said driven shaft from its motor drive and connect it to the second shaft.

5. A pneumatically operable motor for a windshield wiper, said motor having a control handle constructed and arranged to have a limited rotary movement and also movable longitudinally of its axis of rotation, a motor throttle valve operable by said handle during rotary motion thereof, clutch means operable during said longitudinal movement to disconnect the wiper from the motor and connect said wiper to said handle, whereby to permit manual movement of said wiper and simultaneous throttling of said motor.

6. In a pneumatic motor a drivable shaft, a sleeve loosely mounted thereon, said sleeve being provided with a crank arm, means for actuating said arm and sleeve, a second shaft aligned with the first shaft and carrying a sleeve rotatable therewith, said sleeves each acting as a clutch element, and an independent clutch element carried by the first shaft and movable to engage said sleeves alternately, whereby to connect the first sleeve and shaft or to connect the first shaft to the second through the second sleeve.

7. In a pneumatic motor, a driven shaft, control means for said motor, including handle means, and means operable by said handle means to disconnect said shaft from said motor and connect it to said handle means while the motor is in operation.

8. In combination a hand operable windshield wiper, a motor operable independently thereof, means for connecting and disconnecting said hand operable wiper and said motor and motor control means associated with the first means and operable independently thereof.

9. In a pneumatic motor, a pair of axially aligned bellows, a frame member to which one end of one of said pair of bellows is fixed in air-tight relation, a tubular guide member mounted on said frame and extending longitudinally through said bellows and to which the outer end of the other of said bellows is fixed in air-tight relation, a partition separating said bellows and movable longitudinally of said guide member, said tubular guide member being open to and furnishing an air passage to the inside of the outer bellows and valve means carried by said frame member and operable to establish an air passage directly to and from the first bellows and to and from said second bellows through said guide member alternately.

10. In a pneumatic motor, a pair of axially aligned bellows, a frame member to which one end of one of said pair of bellows is fixed in air-tight relation, a tubular guide member mounted on said frame and extending longitudinally through said bellows and to which the outer end of the other of said bellows is fixed in air-tight relation, said tubular guide member being open to and providing an air passage to said outer bellows, a valve and valve controlled air passages located in said frame member and leading to the inner bellows and to said tubular guide member, and means carried by said partition for actuating said valve to shift air communication from one bellows to the other.

ROGER K. LEE.